United States Patent [19]

Nicholson

[11] Patent Number: 4,601,534
[45] Date of Patent: Jul. 22, 1986

[54] SHUTTERLESS PULSE LASER RECORDING SYSTEM AND METHOD

[76] Inventor: Peter Nicholson, 11-51 44th Dr., Long Island City, N.Y. 11101

[21] Appl. No.: 508,499

[22] Filed: Jun. 27, 1983

[51] Int. Cl.$^4$ ............................................. G03H 1/04
[52] U.S. Cl. ................................................ 350/3.83
[58] Field of Search ..................... 350/3.6, 3.66, 3.67, 350/3.8, 3.83, 3.84

[56] References Cited

U.S. PATENT DOCUMENTS

| | | | |
|---|---|---|---|
| 3,444,316 | 5/1969 | Gerritsen | 350/3.8 |
| 4,071,291 | 1/1978 | Suzuhi et al. | 350/3.8 |
| 4,451,114 | 5/1984 | Nicholson et al. | 350/3.75 |
| 4,474,421 | 10/1984 | Nicholson | 350/3.6 |

*Primary Examiner*—Bruce Y. Arnold
*Attorney, Agent, or Firm*—Brumbaugh, Graves, Donohue & Raymond

[57] ABSTRACT

A shutterless pulse laser holographic recording system comprises a holographic image recording medium, a high pass filter positioned between the medium and the object whose image is to be recorded, a white light source to illuminate the object, and a low pass filter between the white light source and the object. The filtering arrangement allows illumination of the object with white light before and during the holographic recording event but prevents the illumination light from reaching the medium. A method for recording is also described.

23 Claims, 1 Drawing Figure

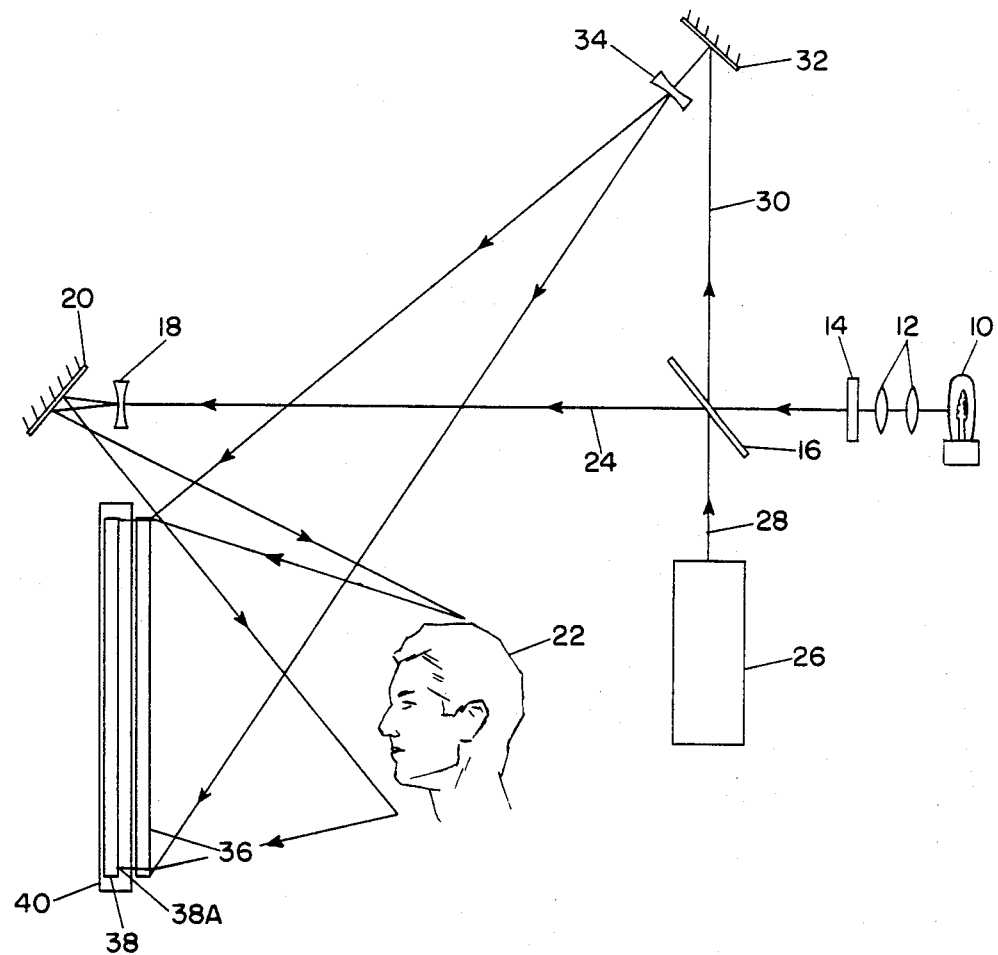

4,601,534

SHUTTERLESS PULSE LASER RECORDING SYSTEM AND METHOD

BACKGROUND OF THE INVENTION

This invention relates to a shutterless pulse laser recording system with particular application to recording holographic images.

In my co-pending patent application Ser. No. 327,180, filed Dec. 3, 1981, entitled "Apparatus and Method for Recording Holographic Images of Human Subjects", I disclose a system for maintaining a human subject in full white light illumination until the moment of recording in order to avoid dilation in the subject's eyes which typically occurs about 0.5 seconds after the subject ceases to be illuminated with white light. In order to avoid recording the image of a subject having dilated eyes, this referenced patent application discloses the use of a shutter placed in front of the recording medium which has a fast opening time, i.e. within about 0.5 seconds. The subject is illuminated with white light until an operator decides to record a hologram, whereupon the white light is extinguished, the shutter opens, and the pulse laser is fired, to thereby create a recorded image in the holographic recording medium.

However, this method not only requires a fast acting shutter having a total opening time within 0.5 seconds, but for producing large holograms, a large shutter is required, which may either be expensive or not readily available. Accordingly, it would be advantageous to eliminate the need for a shutter while still obtaining the advantages associated with maintaining the subject in substantially full white light illumination.

Further, it would be advantageous to illuminate the subject with light which simulates more closely the divergence and directivity characteristics of pulse laser object light used to record the image of the subject, at least insofar as illumination of the subject is concerned.

SUMMARY OF THE INVENTION

In accordance with the present invention, a shutterless recording system is provided comprising an image recording medium having a defined exposure sensitivity wavelength range and at least one exposure side facing an object whose image is to be recorded, a high pass filter positioned on the exposure side of the medium between the medium and the object, and having a cut off wavelength below the upper limit of the exposure sensitivity wavelength range of the medium. Means are also provided for generating substantially white light having wavelength components below the cut off wavelength of the high pass filter to illuminate the object, so that the object can be illuminated by substantially white light and so that the high pass filter blocks the wavelength components of the substantially white light below the cut off wavelength of the high pass filter from reaching the image recording medium. However, object light having a wavelength above the high pass filter cut off wavelength can expose the image recording medium.

Preferably the white light is generated with a white light source and a low pass filter, positioned in front of the white light source, which has a cut off wavelength below the cut off wavelength of the high pass filter. Also preferably, the object light is generated using a pulse laser which generates an object beam toward the object, and a reference beam toward the recording medium, so that object beam light reflected off the object combines with the reference beam light at the recording medium to thereby record a holographic image in the medium. The white light is preferably generated substantially continuously so that the object to be recorded can be maintained in full light up to and during the recording event. When the object to be recorded is a human subject, the extent of pupil dilation, if any, is minimized at the time of recording, so that a realistic image of the human subject is recorded.

Other objects and advantages will become more apparent from the following detailed description and the accompanying drawings.

BRIEF DESCRIPTION OF THE DRAWING

The Figure is an elevated side view of the system in accordance with the invention.

DETAILED DESCRIPTION OF THE PREFERRED EMBODIMENT

While the following system and method will be described with reference to recording holographic images, it should be understood that the system and method are not limited to the field of holography, but can extend to other types of photographic and image recording.

Referring to the Figure, the preferred embodiment in accordance with the invention comprises a high intensity white light source 10 directed through appropriate optics 12, low pass filter 14, beam splitter 16, and negative lens 18, and to a mirror 20 to project the light toward an object 22 whose image is to be recorded.

The beam splitter 16 is substantially transmissive to light below 620 nm at a incident angle of 45 degrees, and will thus transmit most all of the low pass filtered light from the right to the left along the horizontal path 24 shown in the drawing.

When fired, a pulse laser 26 produces pulse laser light 28 toward the front of beam splitter 16. A coating applied to the beam splitter 16 reflects about 70-90 percent of light at a wavelength of 694 nm and transmits the remainder 10-30 percent of this light. The reflected pulse laser light follows horizontal path 24 generally coincident with the filtered white light, and provides object beam light to the object 22. The transmitted pulse laser light continues vertically upward along path 30, is reflected off mirror 32, and passes through negative lens 34 to a high pass filter 36 and holographic recording medium 38, and thus provides a reference beam for the holographic recording process.

Thus, when the pulse laser is fired, object beam light reflected off the object 22 combines with the reference beam light to record a holographic image in the recording medium 38. Since the pulse laser object beam light and the filtered white light traverse generally the same path 24 and have their divergent beams formed by the same negative lens 18, the filtered white light simulates the object beam light in its divergence and directivity characteristics, at least insofar as illumination of the object is concerned.

The recording medium 38 has a defined exposure sensitivity wavelength range and at least one exposure side 38A. The high pass filter 36, positioned on the exposure side 38A of the image recording medium between the medium and the object 16, has a cut off wavelength below the upper limit of the exposure sensitivity wavelength range.

The white light source 10 is illuminated substantially continuously so that the object 22 is illuminated up to and during the recording event. When the object 22 is a human subject, this continuous illumination minimizes, if not eliminates, any pupil dilation which might otherwise occur if the white light source were extinguished prior to the recording event.

The pulse laser is preferably a ruby laser having a wavelength of 694 nm. The high pass filter 36 is transparent to light from the recording pulse laser 26 but opaque to the filtered white light that illuminates the object or subject 22. For the case of a ruby pulse laser, a suitable high pass filter is a Kodak Wratten filter No. 92 which transmits 88 percent of light having a wavelength of 694 nm, and substantially zero percent of the light at a wavelength of 610 nm. These Kodak filters are readily available in sizes up to 14 inches by 18 inches. However, for smaller high pass filters up to a maximum of 10 inches by 10 inches, a Schott 645 red glass filter is preferred, since this filter has a transmission factor close to 94 percent at a wavelength of 694 nm and can be antireflection coated to reduce reflection losses almost entirely.

The low pass filter 14 should be selected with consideration to the spectral sensitivity of the recording medium 38 in the infrared region. When using a red ruby laser having a wavelength of 694 nm, suitable recording mediums available include Agfa-gavaert products designated 8E75HD, and the sensitive 10E75. Both of these emulsion products are sensitive up to a wavelength of about 775 nm. Therefore, the low pass filter 14 should have a cut off wavelength which cuts off light having wavelengths within 610 nm and 780 nm. A suitable low pass filter is a Kodak Wratten filter No. 53 which has a broad band transmission characteristic over the wavelengths 500 to 600 nm, and complete absorbtion over the wavelengths from 610 to 780 nm.

The recording medium 38 is preferably mounted in a recording medium holder 40 which may be simply designed to hold a plate of recording medium, or which may be of the electrostatic or vacuum type. The recording medium 38 may comprise a continuous roll of film having dimensions of 40 inches wide and 100 feet long for example. The high pass filter 36 may be mounted to the outer surface of the recording medium holder 40. Alternatively, the high pass filter 36 may comprise a removable dye layer that is coated on the emulsion of the recording medium during its preparation. Such a filtering dye can be removed or bleached away during the processing of the recording medium. On advantage of having a dye layer coated on the recording medium is to eliminate joint lines which would otherwise would be created using two or more adjacent discrete high pass filters laid edge to edge in front of the recording medium 38. Since the discrete high pass filters discussed above are currently available in sizes up to only 14"×18", such a continuous dye layer applied to the recording medium would enable one to record relatively large holograms without such joint lines showing up in the developed recorded image.

From the foregoing, it will be observed that numerous variations and modifications may be effected without departing from the true spirit and scope of the novel concept of the invention. It is to be understood that no limitation with respect to the specific apparatus or method illustrated here is intended or should be inferred. It is, of course, intended to cover by the appended claims all such modifications as fall within the scope of the claims.

What is claimed is:

1. A shutterless holographic recording system for recording a holographic image of an object on a holographic recording medium, comprising:
   a holographic image recording medium having a defined exposure sensitivity wavelength range and at least one exposure side facing an object whose image is to be recorded;
   pulse laser means for generating an object and a reference beam along different respective paths toward the exposure side of the recording medium;
   a high pass filter positioned on the exposure side of the image recording medium between the image recording medium and the object, said high pass filter having a cut-off wavelength below tbe upper limits of said exposure sensitivity wavelength range, to thereby transmit the object and reference beam light to the recording medium;
   white light generation means for generating substantially white light having wavelength components below the cut-off wavelength of said high pass filter to illuminate the object, said white light generation means comprising a white light source for producing a white light illuminating beam which follows substantially the same optical path as the pulse laser object beam and emulates its directional and divergence characteristics, and a low pass filter positioned between the white light source and the object to be recorded whereby the object can be illuminated by substantially white light, and whereby the high pass filter blocks the wavelength components of the substantially white light below the cut-off wavelength of the high pass filter from reaching the image recording medium, but allows object and reference beam light having a wavelength above the high pass filter cut-off wavelength to expose the image recording medium.

2. The system according to claim 1 wherein the pulse laser means is a red ruby laser having a wavelength of about 694 nm.

3. The system according to claim 1, wherein the pulse laser means comprises a pulse laser and includes an associated beam splitter which splits laser light from said pulse laser into reference beam light and object beam light and directs the object beam light along said object beam light path, wherein the beam splitter is positioned in the path of the low pass filtered white light and receives and transmits a substantial portion of the low pass filtered white light generally along the obejct beam light path.

4. The system according to claim 1 wherein the image recording medium comprises an emulsion.

5. The system according to claim 1 wherein the high pass filter comprises a high pass filter having a cut off wavelength between about 600 nm and 694 nm.

6. The system according to claim 1 wherein the recording medium comprises a generally continuous roll of film.

7. The system according to claim 1 wherein the high pass filter comprises a removable layer of filtering dye coated on the recording medium.

8. The system according to claim 1 wherein the low pass filter comprises a filter having a cut off wavelength below about 610 nm.

9. The system according to claim 1 further including means for holding the recording medium.

10. The system according to claim 9 wherein the high pass filter is mounted on the recording medium holding means.

11. The system according to claim 10 wherein the white light source is substantially continuous.

12. The system according to claim 10 wherein the pulse laser generates an object beam directed toward the object and a reference beam directed toward the recording medium, whereby object beam light reflected off said object combines with the reference beam to record a holographic image in the recording medium.

13. The system according to claim 1 wherein the means for generating substantially white light comprises means for generating white light substantially continuously.

14. A shutterless pulse laser holographic recording system comprising:
  a holographic image recording medium having a defined exposure sensitivity wavelength range, and at least one exposure side facing an object whose image is to be recorded;
  pulse laser means for generating an object beam and a reference beam along different respective paths toward the exposure side of the recording medium;
  a high pass filter positioned on the exposure side of the image recording medium between the medium and the object, said high pass filter having a cut-off wavelength below the upper limit of said exposure sensitivity wavelength range, to thereby transmit the object and reference beam light to the recording medium;
  a white light source which produces a white light illumination beam which follows substantially the same optical path as the pulse laser object beam and emulates its directional and divergence characteristics to illuminate the object; and
  a low pass filter positioned between the white light source and the object, said low pass filter having a cut-off wavelength below the cut-off wavelength of said high pass filter whereby the object can be illuminated by the low pass filtered white light, and whereby the high pass filter blocks the low pass filtered white light from reaching the image recording medium, but allows reference beam light and object beam light from said pulse laser having a wavelength above the high pass filter cut-off wavelength to expose the image recording medium.

15. The system according to claim 14, wherein the pulse laser means comprises a pulse laser and includes an associated beam splitter which splits laser light from said pulse laser into reference beam light and object beam light and directs the object beam light along said object beam light path, wherein the beam splitter is positioned in the path of the low pass filtered white light and receives and transmits a substantial portion of the low pass filtered white light generally along the beam object beam light path.

16. The system according to claim 14 wherein the pulse laser means comprises a red ruby laser having a wavelength of about 694 nm.

17. The system according to claim 14 wherein the image recording medium comprises an emulsion.

18. The system according to claim 14 wherein the high pass filter comprises a high pass filter having a cut off wavelength between about 600 nm and 694 nm.

19. The system according to claim 14 wherein the recording medium comprises a generally continuous roll of film.

20. The system according to claim 14 wherein the high pass filter comprises a removable layer of filtering dye coated on the recording medium.

21. The system according to claim 14 wherein the low pass filter comprises a filter having a cut off wavelength below about 610 nm.

22. The system according to claim 14 further including means for holding the recording medium.

23. The system according to claim 22 wherein the high pass filter is mounted on the recording medium holding means.

* * * * *